3,054,765
POLYVINYL HALIDE COMPOSITIONS PLASTICIZED WITH BIS-NAPHTHENATE ESTERS
John O. Van Hook, Abington, Pa., assignor to Rohm & Haas Company, Philadelphia, Pa., a corporation of Delaware
No Drawing. Filed Sept. 2, 1959, Ser. No. 837,606
13 Claims. (Cl. 260—31.4)

This invention relates to polyvinyl halide resins plasticized with bis-naphthenates of the general formula

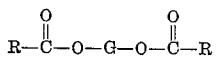

in which R represents a naphthenic acid residue containing an average from about 10 to 16 carbon atoms and G represents a glycol residue.

Some esters of naphthenic acids have been proposed as softening agents for synthetic rubber. Because of the fundamental difference between polymers of the butadiene and acrylonitrile type and of the poly(vinyl chloride) type, it could not be foreseen that the present group of compounds would be valuable plasticizers for polyvinyl halide resins imparting very good plasticization to the resin with unusual stability to elevated temperature.

The bis-naphthenate plasticizers which are employed to plasticize poly(vinyl halide) resins in accordance with the invention may be derived from naphthenic acids, the residue in the esters being represented by R. The useful naphthenic acid primary materials for preparation of the bis-naphthenates are extraction products of crude petroleum oils of varying degree of purity which are generally mixtures of naphthenic acid. The naphthenic acid mixtures comprise predominantly monocyclic acids, the major portion of which contain 8 to 12 carbon atoms and a minor proportion of polycyclic acids generally containing an average of 12 to about 26 carbon atoms.

The R residue may be alike or different. However, indiscriminate selection of naphthenic acids from groups outside of those specified above, as those naphthenic acids predominantly of the bicyclic type brings about such a drop in plasticizing efficiency as to place such acids below the standards demanded by this invention. With the naphthenic acids specified, a somewhat greater latitude in the selection of the glycol is allowable. Accordingly, G is any glycol residue free of acetylenic unsaturation, i.e. including ethylenic and aromatic unsaturation; the glycols may be substituted with atoms which do not interfere or take part in the esterification in preparing the alkylene bis-naphthenates, such atoms including oxygen and sulfur.

Presently in the preferred bis-naphthenates, G represents saturated aliphatic or aromatic glycols having 2 to 8 carbon atoms, in which optionally one or more methylene groups are replaced by oxygen or sulfur atoms.

Typical groups which G may represent include polymethylene glycols, like ethylene glycol, trimethylene glycol, tetramethylene glycol, pentamethylene glycol, hexamethylene glycol, heptamethylene glycol, octamethylene glycol, 2-methyl-pentanediol, 3-methyl-hexanediol, 1,2-propylene glycol, 1,3-propylene glycol, 1,3-butylene glycol, 1,4-butylene glycol, 1,6-hexanediol, methylhexane-1,6-diol, 1,4-butenediol, diethylene glycol, 2,2'-dimethyl-1,3-propylene glycol; straight chain glycols containing from 4 to 10 carbon atoms, such as butanediol-1,4, hexamethylenediol-1,6, octamethylenediol-1,8, and the like; branched chain glycols like 2-ethyl-1,8-octanediol, 2-ethyl-1,10-decanediol, 3,6-diethyl-1,8-octanediol, 4,7-diethyl-2,9-decanediol, 4-ethyl-2,11-dodecanediol, and 3,13-tetradecanediol, 1,2-propanediol, 1,3-propanediol, 2-methyl-2-amylpropanediol-1,3, 2-methyl-2-hexylpropanediol-1,3, 2-ethyl-2-butylpropanediol-1,3, 2,2-dibutylpropanediol-1,3, 2,2-diamylpropanediol-1,3; alkylene ether glycols like diethylene glycol, ethylene ether glycol, propylene ether glycol, 1,2-dimethylethylene ether glycol and the like; thioglycols like thiodiglycol, 1,3'-dihydroxydipropyl sulfide, 1,4-(β-hydroxyethyl)phenylene dithioether; aromatic diols like 1,4-dihydroxymethyl-2,5-dimethylbenzene and 1,4-dihydroxymethylbenzene; alkylene ether thioether glycols as obtained from the condensation of glycols and thiodiglycols; ethylenically unsaturated glycols, the ethylenic unsaturation of which may be partially or fully epoxidized. In combination with the particular glycol selected, what appears to give the plasticized polyvinyl halide resins a combination of a high degree of suppleness with stability at elevated temperatures is the particular selection of the specified naphthenic acids.

The preparation of the bis-naphthenates employed in the invention may be carried out by esterifying a suitable naphthenic acid with a suitable glycol under conditions favoring esterification in the optional presence of an esterification catalyst. A water entrainer may be employed, if desired. The reaction temperatures preferably range from about 100° to 300° C. and after the theoretical amount of water has distilled off, the bis-naphthenate ester is collected. If desired, a purer product may be obtained by washing with dilute alkali and redistilling under reduced pressure. Typical operable esterification catalysts include organic and inorganic acids, such as toluene sulfonic acid, benzene sulfonic acid, alkane sulfonic acid, alkali metal hydrogen sulfate, hydrochloric acid, sulfuric acid, Lewis acids, such as zinc chloride, metallic zinc, boron fluoride, and the like.

Typical water-entrainers include hydrocarbons, like toluene, xylene, heptane, octane, kerosene, mixed aliphatic, aromatic, and cyclic solvents, such as mineral oil, and the like.

The resulting naphthenates are oily liquids generally of a pale yellow or amber color.

In accordance with the invention, the bis-naphthenates are valuable plasticizers for polyvinyl halide resins. The term "polyvinyl halide resin" refers to polymers containing a predominant quantity, that is, a quantity greater than 50%, generally over 60%, by weight of the monomer as vinyl halide units. This includes the homopolymers of the vinyl halides as well as the copolymers and interpolymers prepared therefrom. Other monomers that may be copolymerized with the vinyl halide include the vinyl type monomers such as, for example, those having a single $CH_2=C-$ group, such as vinylidene chloride, vinyl chloroacetate, chlorostyrene, chlorobutadienes, etc. and those copolymers of such vinyl compounds and other unsaturated materials copolymerizable therewith; for example, copolymers of a vinyl halide, such as vinyl chloride, with such materials as vinylidene chloride, vinyl esters of carboxylic acids, for example, vinyl acetate, vinyl propionate, vinyl butyrate, vinyl benzoate; esters of unsaturated acids, for example, alkyl acrylates, such as methyl acrylate, ethyl acrylate, propyl acrylate, butyl acrylate, allyl acrylate and the corresponding esters of methacrylic acid; vinyl aromatic compounds, for example, styrene; esters of α,β-unsaturated carboxylic acids, for example, the methyl, ethyl, butyl, amyl, hexyl, octyl esters of maleic, crotonic, itaconic, fumaric acids and the like. Further useful copolymers are those obtained by copolymerization of vinyl chloride with an ester of an α,β-unsaturated dicarboxylic acid, such as diethyl maleate or other esters of maleic, fumaric, aconitic, itaconic acid, etc., in which 5 to 20 parts by weight of diethyl maleate or other analogous esters are used for every 95 to 80 parts by weight of vinyl chloride.

In the compounding of the polyvinyl halide resins of this invention, the alkylene bis-naphthenates are ordinarily incorporated into the vinyl halide polymers by mixing the powdered resin with the liquid plasticizer followed by mixing and/or kneading and then by curing the mix at an elevated temperature, for example, within the range from 150° to 200° C., on hot rolls or in a heated mixer, such as a Werner-Pfleiderer or Banbury mixer. The proportion of bis-naphthenate esters that may be employed may vary over a great range since it is dependent on the particular esters of this invention which is selected, the specific polyvinyl halide resin to be plasticized, and the final degree of plasticization desired in the resin, this factor in itself being dependent on the ultimate application intended for the resin. With these facts in mind, one skilled in the art may use the bis-naphthenate in a "plasticizing amount," for most purposes this being from about 5 to 100 parts, and more commonly from 20 to 60 parts, of bis-naphthenates per 100 parts of resin. In amounts exceeding 100 parts of bis-naphthenate per 100 parts of polyvinyl chloride resin, the esters of the invention are more commonly suitable for use in organosols and plastisols.

With the polyvinyl halide resin, there may be incorporated other plasticizers, various stabilizers, fillers, dyes, pigments, and the like.

The following examples illustrate the preparation of typical alkylene bis-naphthenates; all parts are by weight.

EXAMPLE 1

A mixture of 260 parts of naphthenic acid (total carbon atoms=13.5), 35 parts of ethylene glycol, 20 parts of toluene sulfonic acid, and 300 parts of toluene was boiled under a Dean-Stark trap for four hours while 20 parts of water were removed by azeotropic distillation. The residue was washed with dilute alkali and water and distilled in a Claisen flask to a head temperature of 186° C. at 0.2 mm. pressure. The residue, 240 parts, was heated with 5 parts of decolorizing carbon at 200° C. and 1 mm. pressure for 10 minutes and filtered. There were collected 170 parts of ethylene bis-naphthenate ester having a saponification number of 226.

Likewise, an ethylene bis-naphthenate ester in which R is a naphthenic acid residue having 12.5 average carbon content was prepared following the same procedure.

EXAMPLE 2

A mixture of 246 parts of naphthenic acid, 31 parts of ethylene glycol and 1 part of 2-N-sulfuric acid was heated under a Dean-Stark trap for 5 hours while 21 parts of water were removed by azeotropic distillation. The residue was cooled, washed with cold 5% sodium hydroxide, treated with charcoal at 225° C. and 0.5 mm. pressure. The charcoal was removed by filtration and the residue was distilled to give 86 parts of product which boiled at 200° to 227° C. at 0.3 mm. pressure. It was further characterized as ethylene bis-naphthenate by an index of refraction of $n_D^{25}$ of 1.4835, specific gravity of 0.992 and a saponification number of 243.

EXAMPLE 3

A mixture of 220 parts of naphthenic acid, 45 parts of 1,3-butylene glycol, 0.33 part of zinc dust and 30 parts of toluene was heated at reflux for 17 hours while removing 19 parts of water by distillation. The residue was washed with 500 parts of 3% sodium hydroxide and distilled to give 152 parts of 3-methyltrimethylene bis-naphthenate which boiled at 226° to 237° C. at 0.4 mm. and had $n_D^{25}$ of 1.4774 and a saponification number of 250.

EXAMPLE 4

One hundred and thirty parts of naphthenic acid and 27 parts of tetramethylene glycol, 50 parts of toluene containing 1 part of p-toluenesulfonic acid, were heated at reflux for 1½ hours while collecting 9 parts of water by azeotropic distillations. Seventy-three parts of product were obtained. It was characterized as tetramethylene bis-naphthenate boiling at 233° to 255° C. at 0.3 mm. mercury having an $n_D^{25}$ of 1.4760, an acid number of 2.0 and a saponification number of 250.

Likewise, naphthenic esters of naphthenic acid and thiodiglycol are prepared.

The polyvinyl halide resins of the invention are further illustrated by the following resinous compositions, no intent to limit the scope of the invention being intended thereby. All parts are by weight.

A standard resinous composition is made up from the following ingredients:

Table I
INGREDIENTS OF THE FORMULATIONS

|  | Parts |
|---|---|
| Polyvinyl chloride | 60 |
| Plasticizer | 40 |
| Barium cadmium laurate | 1.0 |

The following typical bis-naphthenates are incorporated into the vinyl halide polymer by the procedure described above and the resulting supple films are subjected to the following standard evaluation tests. For purposes of comparison, samples of polyvinyl halide resins plasticized with di(2-ethylhexylphthalate), a commercially recognized plasticizer, are subjected to the same tests and the results are reported in Table III below:

TESTS

*Test 1.*—Shore hardness: A Shore "A" durometer, under a weight of 3 pounds, is applied to the test specimens. A recording is made at once and after ten seconds and the hardness is expressed by the two values, of which the first recording is the higher.

*Test 2.*—Torsional modulus at low temperatures: A 2¼ x ¼ sample is cut and mounted in a Tinius-Olsen stiffness tester, which measures the torsional modulus of plastic at various temperatures. The temperature at which a specimen has a torsional modulus of 135,000 lbs./sq. in., known as $T_f$ or $T_{135,000}$ is determined. This roughly corresponds to the "brittle point" obtained by cantilever apparatus.

*Test 3.*—Activated carbon volatility: 2″ squares of weighed specimens are placed between 2-inch layers of activated carbon in sealed glass jars which are maintained at 90° C. for 24 hours. The specimens are removed, dusted free of carbon and reweighed.

*Test 4.*—Soapy water extraction: 3″ squares of weighed specimens are immersed in a 1% aqueous solution of Ivory soap at 90° C. for 24 hours, after which they are thoroughly washed, dried, and reweighed.

*Test 5.*—Hexane extraction: Weighed samples are immersed in white, lead-free hexane at 25° C. for two hours, after which they are thoroughly dried and reweighed.

*Test 6.*—Compatibility: Weighed conditioned duplicate samples, 4 inches by 4 inches by 0.010 inch, are placed between two sheets of cardboard, which have been conditioned at least 15 hours. The specimens are in contact with the white, coated side of the cardboard. The cardboard specimen sandwiches are placed between 5 inches by 5 inches by 1 inch wood blocks under a 3-kilogram weight. After seven days, the specimens are removed from the stack, conditioned, and reweighed. Percent plasticizer loss is calculated. The cardboard sheets are examined qualitatively for evidence of plasticizer or plasticizing stabilizer stains.

Table II
KEY OF PLASTICIZING BIS-NAPHTHENATE

| Compound name: | Key for compounds in Table III |
|---|---|
| Tetramethylene bis-naphthenate | 1 |
| 3-methyl-trimethylene bis-naphthenate | 2 |
| Ethylene bis-naphthenate | 3 |
| Di(2-ethylhexyl)phthalate | 4 |

The performance data of the polyvinyl chloride compositions are recorded in Table III. Except for the results of Test 1, which are expressed in units from 1 to 100, and the figures in Test 2 which represent ° C., all other results are the amounts expressed as percentage loss of weight of the polyvinyl halide film. The test numbers correspond to those given above.

*Table III*

RESULTS OF TYPICAL PERFORMANCE TESTS

| Tests | Compounds | | | |
|---|---|---|---|---|
| | 1 | 2 | 3 | 4 |
| 1 | 76 | 83 | 82 | 68 |
| 2 | −28 | −23.5 | −22 | −31 |
| 3 | 2.5 | 3.7 | 3.7 | 8.0 |
| 4 | 4.4 | 3.3 | 4.4 | 3.0 |
| 5 | 31.0 | 34 | 33.5 | 25.0 |
| 6 | 1.1 | 1.4 | 1.3 | 0.2 |

The data show that the resinous compositions exhibit a high degree of plasticization and exceptionally good low volatility at elevated temperature combined with other desirable properties.

A series of resinous formulations of the following composition are compounded:

*Table IV*

INGREDIENTS OF THE FORMULATIONS

Polyvinyl chloride _____ 65
Plasticizer _____ 35
Barium cadmium laurate _____ 1

The following plasticizers are blended into the polyvinyl chloride resin: the naphthenic acid esters of naphthenic acid mixtures of a total carbon atom content in the range of 8 to 12, and 2-ethylhexane-1,3-diol, neopentylglycol thiodiglycol, dipropyleneglycol, trimethyleneglycol, pentamethyleneglycol, triethyleneglycol, butane-2,3-diol, and dihydroxymethylbenzene.

The plasticized resins are flexible and soft. When subjected to the above evaluation tests, they display good low volatility at elevated temperature with satisfactory general plasticization properties. Other bis-naphthenates of the invention perform similarly.

The above formulations are modified by replacing polyvinyl chloride by copolymers of (A) 87 parts vinyl chloride
    13 parts vinyl acetate
(B) 80 parts vinyl chloride
    20 parts vinylidene chloride
(C) 80 parts vinyl chloride
    20 parts methyl acrylate
(D) 95 parts vinyl chloride
    5 parts vinyl isobutyl ether The resinous compositions are tested as described above. All compositions are supple and flexible and they exhibit improved permanence over resinous compositions plasticized with di(2-ethylhexyl)phthalate.

I claim:
1. A plasticized resinous composition comprising a polymer selected from the group consisting of homopolymers of vinyl chloride and copolymers of vinyl chloride with an ethylenically unsaturated monomer copolymerizable therewith, said copolymer containing at least about 60% by weight of vinyl chloride copolymerized therewith, and said plasticized resinous composition having incorporated therein a plasticizing amount of a bis-naphthenate having
    (1) a diol moiety free of acetylenic unsaturation and
    (2) two naphthenate groups having each an average of 10 to 16 carbon atoms.
2. The plasticized resinous composition of claim 1, in which the diol moiety contains 2 to 8 carbon atoms.
3. The plasticized resinous composition of claim 1, in which the diol moiety is a hydrocarbon.
4. The plasticized resinous composition of claim 1, in which the diol moiety is ethylenically unsaturated, said ethylenic unsaturation being at least in part epoxidized.
5. The plasticized resinous composition of claim 1, in which the polymer is a homopolymer of vinyl chloride.
6. The plasticized resinous composition of claim 1, in which the polymer is a copolymer of vinyl chloride with an ethylenically unsaturated monomer copolymerizable therewith, said copolymer containing at least about 60% by weight of vinyl chloride copolymerized therewith.
7. The plasticized resinous composition of claim 6, in which the ethylenically unsaturated monomer copolymerized with the vinyl chloride is vinyl acetate.
8. The plasticized resinous composition of claim 6, in which the ethylenically unsaturated monomer compolymerized with the vinyl chloride is vinylidene chloride.
9. The plasticized resinous composition of claim 1, in which the plasticizing ester is tetramethylene bis-naphthenate.
10. The plasticized resinous composition of claim 1, in which the plasticizing ester is methyl trimethylene bis-naphthenate.
11. The plasticized resinous composition of claim 1, in which the plasticizing ester is ethylene bis-naphthenate.
12. The plasticized resinous composition of claim 1, in which the plasticizing ester is a bis-naphthenic acid ester of 2-ethylhexane-1,3-diol.
13. The plasticized resinous composition of claim 1, in which the plasticizing ester is a bis-naphthenic acid ester of dipropylene glycol.

References Cited in the file of this patent

UNITED STATES PATENTS

| 2,325,946 | Garvey | Aug. 3, 1943 |
| 2,438,753 | Kellog | Mar. 30, 1948 |
| 2,500,891 | Alexander | Mar. 14, 1950 |
| 2,891,089 | Jolly | June 16, 1959 |